United States Patent [19]

Gates

[11] Patent Number: 4,854,158

[45] Date of Patent: Aug. 8, 1989

[54] METHOD AND APPARATUS FOR LEAK TESTING A FLUID CONTAINING CHAMBER

[75] Inventor: Donald C. Gates, Troy, Mich.

[73] Assignee: Expertek, Inc., Detroit, Mich.

[21] Appl. No.: 234,805

[22] Filed: Aug. 22, 1988

[51] Int. Cl.[4] .............................................. G01M 3/06
[52] U.S. Cl. ..................... 73/45.5; 73/49.2; 250/573
[58] Field of Search ............... 73/41.2, 45.5, 49.2 R; 250/573

[56] References Cited

U.S. PATENT DOCUMENTS

3,516,284  6/1970  Lockard ............................. 73/45.5
3,590,256  6/1971  Neeff ................................. 73/45.5

Primary Examiner—Stewart J. Levy
Assistant Examiner—Michele Simons
Attorney, Agent, or Firm—Harness, Dickey & Pierce

[57] ABSTRACT

A method and apparatus is disclosed for leak testing a fluid containing chamber wherein the chamber is pressurized with a gas and is submerged in liquid. The bubbles of gas rising from the submerged chamber are directed past a predetermined location which is adjacent to a photoelectric detector. The electrical signals from the photoelectric detectors are counted and when the number bubbles exceeds a predetermined number a fault signal is activated indicating a leaking container. By grouping a number of adjacent photocells into a predetermined set, the apparatus can discriminate between random bubbles rising from the chamber as it is submerged, and a number of bubbles all originating from a given location.

28 Claims, 4 Drawing Sheets

METHOD AND APPARATUS FOR LEAK TESTING A FLUID CONTAINING CHAMBER

BACKGROUND OF THE INVENTION

This invention relates to a leak detection apparatus and more particularly to an automated means for detecting leaks via liquid immersion testing.

Numerous components are manufactured which must meet a standard for a "leak tightness". Leak tightness is a relative term, as nothing can ever by completely free of leakage. A balance must be made between the increasing cost of finding smaller and smaller leaks and their importance to the functioning of the unit over its useful life. Leak tightness is the practical leakage that is acceptable under normal operating circumstances.

Components which require some degree of leak tightness, for example, include fuel tanks, radiators, fuel system components, water pumps, refrigeration components, heater cores, torque convertors, hydraulic and pneumatic components etc. The acceptable leakage will depend upon the usage of the component with respect to the type of fluid which must be contained, i.e. a gas or a liquid, and whether or not the contents will be pressurized.

Several leak detection methods are commonly used in industry. Each method has its own advantages, limitations and sensitivity range. As a result, not all methods are useful for every application. The correct choice of the leak detection method should optimize cost, sensitivity and reliability of the test.

Liquid immersion testing is one of the oldest documented methods used to detect leaks. Liquid immersion testing operates on the basis of a differential pressure at the leak creating a flow of a gas from within the component to the liquid outside. The part being tested is pressurized with a gas and then immersed in a liquid medium, generally water. The gas escaping the pressurized component produces one or more bubbles in the liquid which then rise to the surface of the water. The component being tested is allowed to remain in the liquid for a period of time while the liquid test medium is examined for the presence of bubbles. The location of bubbles indicates the location of a leak and the frequency and size of the bubbles can be used to estimate the leakage rate.

Liquid immersion testing has several advantages which include, low equipment cost relative to other methods, location of the leak can be determined, the equipment can easily be made durable enough for factory floor applications, and various size and shape components can be tested utilizing one test apparatus.

The primary disadvantage with liquid immersion testing is the requirement of an operator to visually inspect the water for bubbles of leaking gas. This adds subjectivity to the test and, in addition, research has shown that an operator's ability to accurately identify leaks decreases during the course of a typical eight hour work shift.

Accordingly, it is an object of this invention to provide a liquid immersion leak testing apparatus which includes an automatic means for detecting the presence of bubbles of gas leaking from the component being tested.

It is an advantage of this invention that a low cost liquid immersion testing apparatus can be equipped with an automatic sensing means which provides increased accuracy in detecting leaks without significantly increasing the cost of the device.

SUMMARY OF THE INVENTION

The leak detection apparatus of this invention employs a tank for submerging the component to be tested in a liquid test medium, typically water. Other liquids may be used as long as they are compatible with the test apparatus and the component being tested. Automatic identification of bubbles is accomplished by using a photoelectric detector such as the Clairex CL-703L photocell. To provide complete coverage of the surface area above the component being tested, a plastic channeling device is used to direct the bubbles rising in the liquid along a predetermined path which passes beneath the photocell.

It is contemplated that the channeling device be constructed of a transparent plastic material such as acrylic which on its lower side has a plurality of ridges and grooves extending longitudinally of the acrylic panel. The panel is positioned in the liquid above the component being tested and is inclined along its length such that bubbles rising from the component will impact the acrylic panel, move upward to one of the grooves in the underside of the panel and travel along the groove to the upwardly inclined end of the acrylic panel. A photocell is positioned above each groove at the upper end of the panel.

The number of photocells used can range from two or three to as many as fifty to provide coverage to the entire component being tested. By increasing the number of photocells, the corresponding area of the component being tested by each detector is reduced, thereby increasing the accuracy of leak localization.

An electrical circuit, which may or may not include a computer, can be used to count the number of bubbles detected by the photocells and a fault signal can be activated when the number of bubbles counted exceeds a predetermined number, thereby indicating a leaking component.

The system can detect gross leaks to very small leaks having a leakage rate of $10^{-4}$ cc/sec. The test time must be increased as sensitivity to increased to allow a bubble to be formed which is large enough to overcome the surface tension holding the bubble to the component surface.

Further objects, features and advantages of the invention will become apparent from a consideration of the following description and the appended claims when taken in connection with the accompanying drawings.

BRIEF DESCRIPTION OF THE DRAWINGS

FIG. 6 is a side elevation view of a portion of the apparatus of FIG. 1 in which the tank is sealed and a partial vacuum is created in the tank above the water.

DETAILED DESCRIPTION OF THE INVENTION

Figure 1:
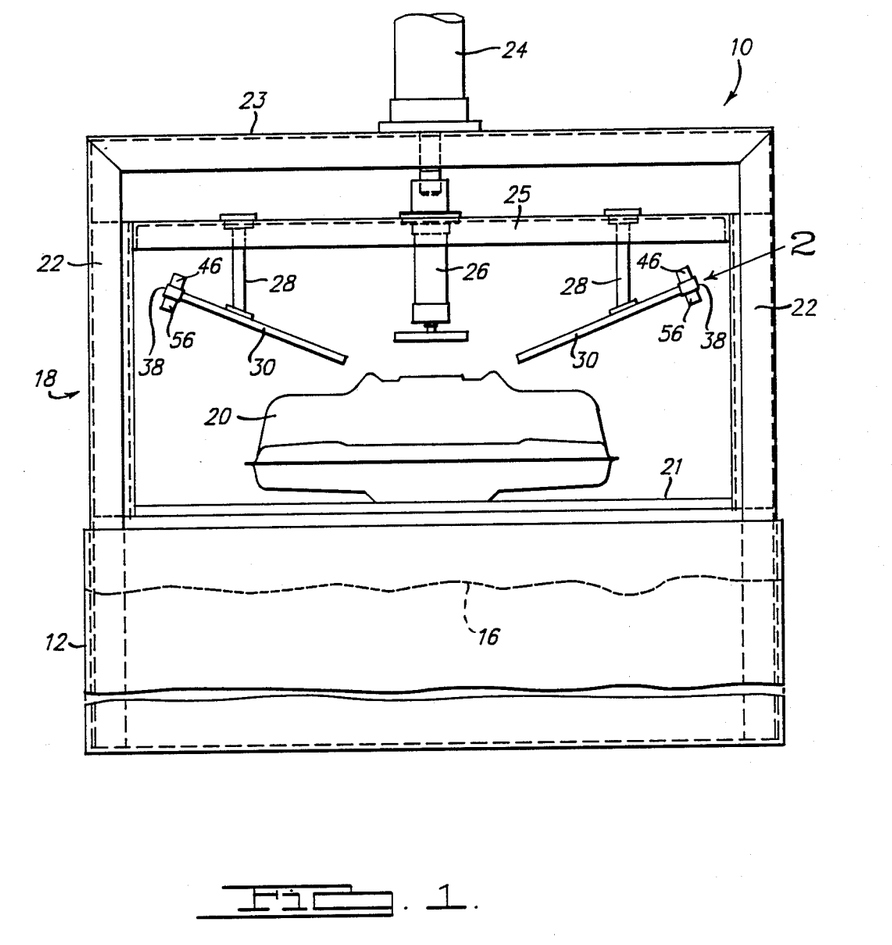
FIG. 1 is a side elevation view of a immersion leak test apparatus employing photocells to automatically detect the presence of bubbles according to this invention.

With reference to the drawings, an automated liquid immersion leaking apparatus 10 is illustrated in FIG. 1. The leak test apparatus includes a liquid holding tank 12 which contains a quantity of water to a level indicated at 16.

Positioned above the water holding tank 12 is a cage like test fixture 18 which is used for lowering and raising a component 20, in this case a fuel tank, into and out of the water in the holding tank 12. The fixture 18 includes a base support member 21 upon which the fuel tank is positioned, vertical frame members 22 and an upper cross member 23. Extending upward from the cross member 23 is a support cylinder 24 which is used for raising and lowering the fixture 18 into and out of the water.

Positioned below the upper cross member 23 is an intermediate cross member 25 which supports a cylinder 26 for sealing the fuel sender opening in the top surface of the fuel tank. Another cylinder (not shown) is used for sealing the fuel filler neck opening of the fuel tank. In addition, one or more other cylinders may be required for holding the fuel tank down against the base member 21 while conducting the test. Cylinder 26, in addition to sealing the fuel sender opening, also includes a conduit for providing air pressure to the interior of the fuel tank once it is submerged in the water. The component 20 can be either manually or automatically positioned on the base 21 when the fixture 18 is in the raised position as shown in FIG. 1.

Also extending downward from the intermediate cross member 25 are support brackets 28 which support acrylic panels 30 inclined relative to horizontal. Panels 30 are used to deflect any bubbles of air rising from the fuel tank past one of a plurality of photocells positioned at the upper end of the acrylic panels 30 as will be discussed in detail below. The panels 30 are shown in a position in which only a portion of the welded seam of the fuel tank is being tested for leaks. Additional panels 30 and photocells can be positioned over other areas of the fuel tank 20 to provide leak testing of additional portions of the fuel tank.

Figure 2:
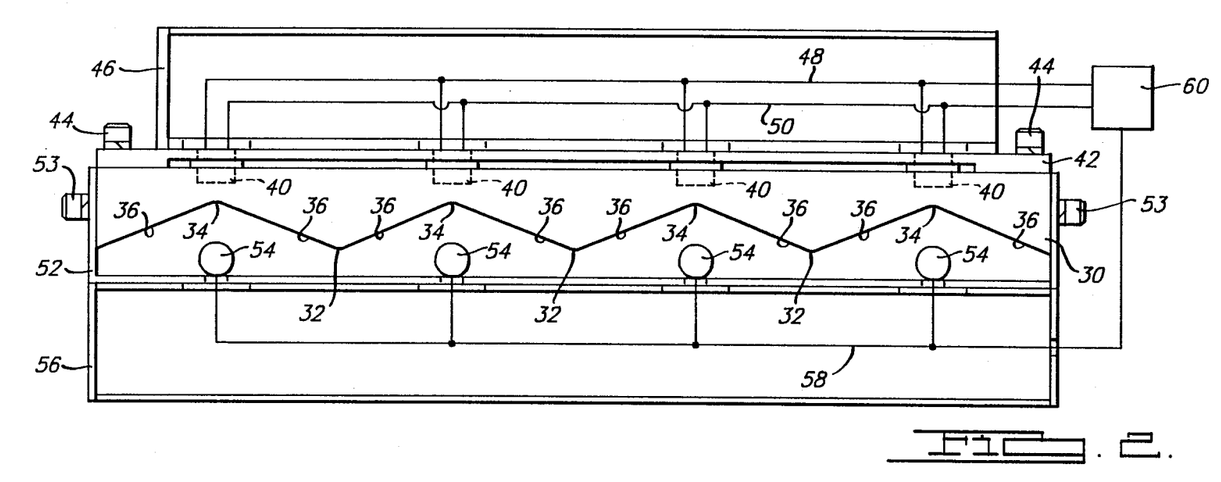
FIG. 2 is an end view as seen in the direction of arrow 2 of the channeling device used to direct the bubbles past the photocells.

FIG. 2 is a view in the direction of arrow 2 of FIG. 1 and illustrates the detail of the upper end 38 of the panels 30. The bottom surface of the acrylic panel 30 is corrugated to form a plurality of evenly spaced ridges 32 and grooves 34 having flat inclined surfaces 36 extending between each ridge and groove. The ridges are spaced approximately two inches from each other. At the grooves 34, the surfaces 36 do not form a sharp corner but form a curved transition having a radius of approximately ¼ inch. The angle between adjacent surfaces 36 is approximately 135°. The angle of inclination of the panel 30 in the water is approximately 20°-30°. The angle of the panel 30 must be large enough to allow the bubbles to continuing rising in the grooves 34. However, as this angle is increased, the depth of the tank 12 must also be increased to enable complete submerging of the panel 30 in the tank.

The bottom surface of the panel 30 must have a proper surface finish to prevent bubbles from sticking to the panel. The surface must permit "wetting" or the formation of a film of water when the panel is out of the water. A surface that will not "wet" will form droplets of water on its surface as opposed to a water film. A smooth acrylic panel will not "wet". When an air bubble contacts a smooth panel, the bubble will displace all water between the bubble and the smooth surface such that surface tension of the bubble will hold the bubble to the panel and prevent it from rising upward.

To ensure "wetting" of the panel 30, the bottom surface is finished by sanding with an 80 grit sand paper in a swirl pattern or fine sandblasting with 220-240 grit sand at 100 psi. The resultant surface is similar to frosted glass. If the surface is too rough, however, bubble movement can also be impeded.

Above each groove 34 near the upper end 38 of the acrylic panel 30 is a photocell 40. Photocells 40 are placed in small holes in the upper surface of the acrylic panel 30. A photocell retaining plate 42 above photocells 40 holds the photocells in position and is secured to the plexiglas panel by screws 44. A photocell cover 46 is attached to the upper surface of the retaining plate 42. Photocell cover 46 is a plexiglas tubing through which extends the lead wires 48 and 50 to the photocells 40. The lead wires are encapsulated in a RTV rubber or a like compound which fills the interior of the photocell cover 46.

Extending below the acrylic panel 30 directly below the photocells 40, is a sheet metal light bulb bracket 52. Bracket 52 is attached to the sides of the panel 30 by screws 53. Positioned directly below each photocell is a light bulb 54 in a socket secured to the bracket 52. Light bulbs 54 can be incandescent lights or light emitting diodes. These lights 54 are used to provide light which is directed into the photocells 40 for aiding in detection of bubbles by the photocells. Extending below the bracket 52 is a wire conduit 56 made of plexiglas tubing. Lead wire 58 for the lights 54 is carried through the conduit 56 which is also filled with a RTV compound encapsulating the wire 58 within the conduit 56.

The electrical connections to the lights 54 and and photocells 40 are all water tight. The photocells are hermetically sealed in glass. The lead wires 48, 50 and 58 are all connected to a water tight electrical connector 60. Connector 60 is in turn connected to the control circuit for the leak detection apparatus.

Figure 3:
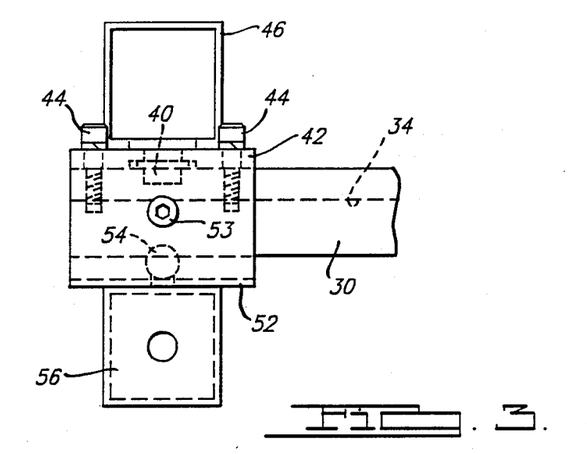
FIG. 3 is an enlarged side view of the upper end of the channeling device.

A side view of the upper end of the panel 30 is shown in FIG. 3.

A bubble of air leaking from the component 20 will rise in the water until it contacts the bottom side of the panel 30. Once the bubble contacts the panel 30, it will rise along a surface 36 until it reaches a groove 34. Once in groove 34, the bubble will continue to rise through the groove until it reaches the upper end 38 of the panel 30, from there the bubble will rise to the surface of the water. As the bubble rises through the groove 34, it will pass between a photocell 40 and light 54, interrupting the light directed toward the photocell such that the bubble will be detected by the photocell 40.

Figure 4:
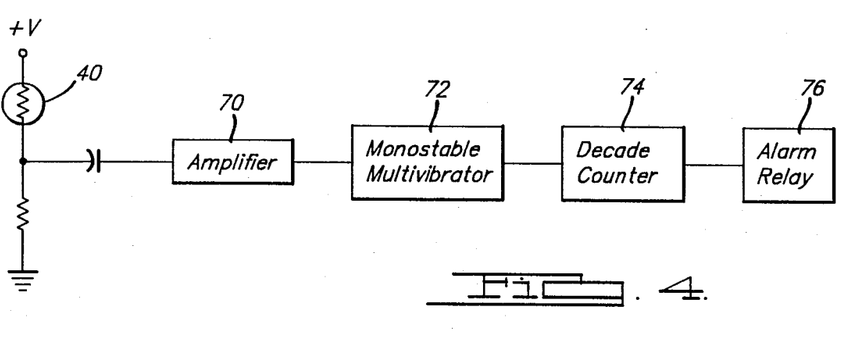
FIG. 4 is a schematic of the electrical circuit used to count the bubbles and activate the fault signal.

A schematic of the electric circuit for operation of the photocells provided in FIG. 4. The electrical signal produced by a photocell is first amplified by amplifier 70. The amplified signal then activates a monostable muti-vibrator 72 which produces a one half second timed pulse in response to a bubble detected by photocell 40. The timed pulse from the muti-vibrator 72, which can be programmed for periods other than a half second, activates a decade counter 74. When the number of pulses counted by the decade counter exceeds a predetermined value, an alarm relay will be activated thereby indicating a leak in the component being tested. An amplifier and multi-vibrator are provided for each photocell 40 with the pulse generated by each of the multi-vibrators being fed to a single decade counter for counting the total number of bubbles detected.

Depending on the sophistication required for the leak testing, a computer can be used in place of the decade counter for counting the number of bubbles. One advantage of using a computer is the capability of discriminating between random air bubbles which may have formed on the outside of the component as the component was being submerged, referred to as attached bubbles, and bubbles indicating a leak. For example, assume that it has been determined that five bubbles rising from a component indicate a leak. The decade counter will indicate a leak once five bubbles have been counted. However, the decade counter is not be able to discriminate between attached bubbles and leak bubbles.

Attached bubbles will rise from random locations on the component surface. Leak bubbles on the other hand, are formed at the same location on the component surface. The bubbles from a leak will be detected by a single photocell 40 or by two or three adjacent photocells. Small current in the water may cause bubbles originating from the same leak to be sensed by different photocells.

With a computer instead of the decade counter, each photocell can be monitored to determine the number of bubbles detected by each photocell rather than merely sum the total number of bubbles detected by all photocells with the decade counter.

The computer can be programmed to add the bubbles detected from a set of two or more photocells positioned above adjacent grooves 34 in the panel 30. When the total bubble count for a set exceeds a predetermined number, for example 5, this would indicate a leak and an alarm would be activated, rejecting the component being tested.

An example is shown in Table I of how these sets can be arranged and a possible scenario for the bubbles counted in each set. In this example, one panel 30 having ten grooves 34 and photocells 40 is used to test the component. Eight sets of three adjacent photocells are formed. Set one is comprised of cells 1, 2, and 3. Set two is comprised of cells 2, 3, and 4, etc. The sets are overlapping in that, except for the cells at the edge of the panel, each cell is in three different sets.

TABLE I

| SET | PHOTOCELLS | BUBBLE COUNT |
|---|---|---|
| 1 | 1, 2, 3 | 1 |
| 2 | 2, 3, 4 | 3 |
| 3 | 3, 4, 5 | 5 Reject |
| 4 | 4, 5, 6 | 4 |
| 5 | 5, 6, 7 | 3 |
| 6 | 6, 7, 8 | 1 |
| 7 | 7, 8, 9 | 1 |
| 8 | 8, 9, 10 | 1 |

In this example, the number of bubbles counted by the photocells in set three has reached the predetermined number of five, whereby a leak is indicated and the fault signal is activated. In this manner, the apparatus can discriminate between five bubbles originating from random sources on the component surface and five bubbles that are originating from approximately the same location. It is necessary to combine the bubbles counted in each adjacent grooves as currents in the water tank may cause bubbles originating from the same location to be directed to adjacent grooves as opposed to the same groove.

The computer can also be used to record the location of leaks in several components tested over a period of time which can be used to determined deficiencies in the manufacturing process of the component. Data regarding the number of parts tested, accept-reject percentages, frequency of leakage by location and other data can also be generated by the computer.

Figure 5:
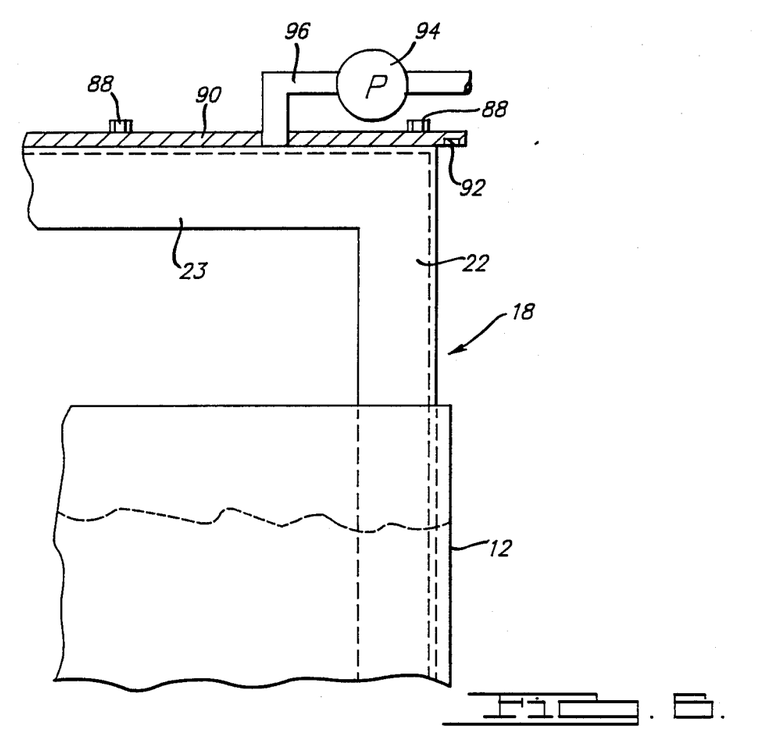
FIG. 5 is a schematic of a alternative circuit to count bubbles which discriminates between attached bubbles formed when the component is submerged and leak bubbles.

An alternative electrical circuit is shown in FIG. 5 which utilizes multiple decade counters instead of a computer to discriminate between attached bubbles and leak bubbles. In FIG. 5, sets are formed by two adjacent photocells as opposed to three as discussed above. The outputs of each of the monostable multi-vibrators 72 are fed to two decade counters. For example, the output from multi-vibrator 72b is fed to counters 101 and 102, the output from multi-vibrator 72C is fed to counters 102 and 103, etc.

In this manner, the bubbles sensed by photocells 40b and 40c are counted by counter 102, the bubbles sensed by photocells 40c and 40d are counted by counter 103, etc. Diodes 111–114 are used to prevent more than two adjacent counters from counting a single bubble. Although the number of photocells in each set in this example is two, the sets can be formed by more than two photocells by adding more leads from the multi-vibrators to additional counters.

Discrimination between attached bubbles and leak bubbles is thus accomplished without the requirement of a computer. The circuit of FIG. 5, unlike the computer, does not provide for data collection as previously described.

In operation, the component is tested by first sealing the openings, for example sealing the fuel filler pipe opening and the fuel sender opening in the tank 20 and then pressurizing the component. The component is retained in a fixture which is then submerged in the water in the tank 12. The bracket 28 with the panel 30 is supported in the water by the fixture above the tank 20.

After lowering the fixture in the water, a time delay of approximately eight seconds is allowed to elapse before beginning the test. The delay is to allow attached bubbles which were formed as the fixture was submerged to rise to the water surface. During this eight second delay, the computer can preform a system self check to determine if each photocell 40 is functioning. To preform this self check, the lights 54 are turned off and then on to generate a pulse from each photocell. If one or more of the photocells are not functioning properly, an appropriate indicator will be activated and the testing operation stopped. After performing the self check and waiting for the eight second delay, the leak test is initiated and the space below each photocell 40 is searched for the presence of bubbles.

The length of the test depends upon the required sensitivity of the leak test. The smaller the allowable, the longer the test must be conducted. The smaller the leak, the longer the time necessary for enough gas to leak from the component to form a bubble large enough to overcome the surface tension holding the bubble to the component surface and allow it to rise to the water surface. Once the test has been completed, the fixture 18 is removed from the tank 12 allowing access to the component for removal and transfer to the appropriate location for either an accepted or rejected component.

The rate of bubble emission from a leak can be greatly increased by creating a partial vacuum in the tank above the water surface. This will reduce the time required to preform the test. FIG. 6 illustrates a tank equipped for use with a vacuum.

A tank cover plate 90 is attached to the upper cross member 23 by bolts 88. A seal 92 is mounted to the lower surface of plate 90 at its periphery. Seal 92 seals against the top surface of tank 12 when the fixture 18 is completely lowered onto the tank 12. Once sealed, a partial vacuum of approximately 15 inches hg is created in the tank by the vacuum pump 94 connected to the tank interior through conduit 96.

The test is then performed as described above. The vacuum results in an increased rate of bubble formation thereby reducing the time necessary for detecting a give leakage rate.

By automating the bubble detection in a liquid immersion leak test apparatus, the primary disadvantage to liquid immersion testing, operator subjectivity is eliminated. The advantages however, such as low cost, durability and adaptability to more than one component are still retained with the automated leak detection.

It is to be understood that the invention is not limited to the exact construction or method illustrated and described above, but that various changes and modifications may be made without departing from the spirit and scope of the invention as defined in the following claims.

What is claimed is:

1. An apparatus for leak testing at least a portion of a fluid containing chamber by detecting bubbles of a gas rising from said portion when pressurized and submerged in a liquid comprising:
   means positionable in said liquid above said chamber for deflecting said bubbles past one of a plurality of predetermined locations;
   photoelectric means adjacent said predetermined locations for detecting said bubbles passing said predetermined locations and producing an electrical signal in response thereto; and
   means for counting the number of electrical signals.

2. The apparatus of claim 1 wherein:
   said photoelectric means comprises a photocell in optical communication with each of said predetermined locations.

3. The apparatus of claim 2 further comprising:
   means for adding the number of electrical signals produced by two or more photocells in communication with adjacent predetermined locations.

4. The apparatus of claim 3 further comprising:
   means for indicating a leak from said chamber when the sum of said electrical signals from said two or more photocells exceeds a predetermined number.

5. The apparatus of claim 1 further comprising a light radiation source adjacent each of said plurality of predetermined locations opposite and photoelectric detection means, a portion of said light radiation directed toward said photoelectric detection means.

6. The apparatus of claim 2 wherein:
   said deflecting means includes a panel of a transparent material having a corrugated surface of alternating parallel ridges and grooves extending in one direction along the bottom surface of said panel;
   said panel is inclined upwardly in said one direction whereby said rising bubbles travel through said grooves past the upward end of said panel; and
   said predetermined location being in each of said grooves near said upwardly inclined end of said panel.

7. The apparatus of claim 6 wherein said transparent material is a polymeric material.

8. The apparatus of claim 6 wherein said photocells are mounted to the upper surface of said panel above each groove near said upwardly inclined end.

9. The apparatus of claim 6 wherein the bottom surface of said panel is textured to provide for the formation of a film of water on said surface when wetted.

10. An apparatus for detecting leaks in at least a portion of a fluid containing chamber, said portion being pressurized with a gas and submerged in a liquid, comprising:
    means for submerging said portion in said liquid whereby gas leaking from said portion will form bubbles rising from said portion to the surface of said liquid;
    means positionable in said liquid above said portion for deflecting said rising bubbles past one of a plurality of predetermined locations;
    photoelectric detection means adjacent each of said predetermined locations for detecting said bubbles passing said predetermined locations;
    means for counting the number of bubbles detected by said photoelectric means; and
    means for indicating a leaking chamber when said number of bubbles exceeds a predetermined number.

11. The apparatus of claim 10 wherein:
    said photoelectric means comprises a photocell adjacent said predetermined locations.

12. The apparatus of claim 11 further comprising a light radiation source adjacent said predetermined locations opposite said photocells, a portion of said light radiation directed toward said photocells.

13. The apparatus of claim 10 wherein said deflecting means includes a transparent material.

14. The apparatus of claim 13 wherein said transparent material is a polymeric material.

15. The apparatus of claim 11 further comprising:
    means for adding the number of bubbles detected by two or more adjacent photocells; and
    means for indicating a leaking chamber when said number of bubbles detected by said two or more adjacent photocells exceeds a predetermined number.

16. The apparatus of claim 10 further comprising:
    means for creating a partial vacuum in said tank above said liquid.

17. A method of leak testing a fluid containing chamber comprising the steps of:
    pressurizing said chamber with a gas;
    submerging said chamber in a liquid whereby said gas leaking from said chamber will form bubble which rise to the surface of said liquid;
    deflecting said bubbles past one of a plurality of predetermined locations;
    deflecting the presence of said bubbles as said bubbles pass said predetermined locations;
    counting the number of bubbles passing said predetermined locations; and
    indicating a leaking chamber when the number of bubbles exceeds a predetermined number.

18. The method of claim 17 wherein:
    said bubbles are detected by a photocell at each of said plurality of predetermined locations.

19. The method of claim 18 further comprising:
summing the number of bubbles detected by a plurality of adjacent photocells; and
indicating a leak from said chamber when said sum exceeds a predetermined number.

20. The method of claim 17 wherein said counting of said bubbles further comprises the steps of:
producing an electrical signal by said photocell when a bubble is detected;
producing a timed pulse of electrical current from a monostable mutli-vibrator in response to said electrical signal;
counting the number of electrical pulses; and
indicating a leak from said chamber when the number of electrical pulses exceeds a predetermined number.

21. A method of leak testing a fluid containing chamber comprising the steps of:
pressurizing said chamber with a gas;
submerging said chamber in a liquid whereby said gas leaking from said chamber will form bubbles which rise to the surface of said liquid;
deflecting said bubbles past one of a plurality of predetermined locations;
detecting the presence of said bubbles with a photocell as said bubbles pass one of said predetermined locations;
counting the number of bubbles detected; and
indicating a leaking chamber when the number of bubbles exceeds a predetermined number.

22. The method of claim 21 further comprising the step of discriminating between attached bubbles formed on the outer surface of said chamber when said chamber is submerged and leak bubbles formed from gas leaking from said chamber after being submerged by summing the number of bubbles detected by at least two adjacent photocells and indicating a leak when said sum exceeds said predetermined number.

23. The method of claim 21 further comprising:
stimulating each photocell; and
stopping the leak test if an output is not produced by each photocell.

24. The method of claim 21 further comprising:
waiting a predetermined time after submerging said fluid containing chamber before detecting said bubbles to allow attached bubbles formed on the outer surface of said chamber when said chamber is submerged to rise the said liquid surface.

25. The method of claim 21 further comprising the step of:
creating a partial vacuum above said liquid.

26. An apparatus for detecting leaks in at least a portion of a fluid containing chamber, said portion being pressurized with a gas and submerged in a liquid, comprising:
means for submerging said chamber in said liquid whereby gas leaking from said chamber will form bubbles rising from said chamber to the surface of said liquid;
a panel of a transparent material positionable in said liquid above said portion of a fluid containing chamber having a corrugated surface of alternating parallel ridges and grooves extending in one direction along the bottom surface of said panel, said panel inclined upwardly in said one direction whereby said rising bubbles travel through said grooves past the upwardly inclined end of said panel;
a photocell above each groove adjacent said upwardly inclined end for detecting said bubbles traveling through said grooves and producing an electrical output signal;
means for counting the number of bubbles detected by said photocells means; and
means for indicating a leaking chamber when said number of bubbles exceeds a predetermined number.

27. The apparatus of claim 26 wherein said counting means comprises:
means for amplifying the output from said photocells;
monostable multi-vibrator means for producing a timed pulse in response to the output from said amplifying means; and
a counter for counting the number of pulses from said multi-vibrator means.

28. An apparatus for leak testing at least a portion of a fluid containing chamber by detecting bubbles of a gas rising from said portion when pressurized and submerged in a liquid comprising:
means for creating a partial vacuum above said liquid;
means positionable in said liquid above said portion of a fluid containing chamber for deflecting said bubbles past one of a plurality of predetermined locations;
photoelectric means adjacent said predetermined location for detecting said bubbles passing said predetermined locations and producing an electrical signal in response thereto; and
means for counting the number of electrical signals.

* * * * *

UNITED STATES PATENT AND TRADEMARK OFFICE
CERTIFICATE OF CORRECTION

PATENT NO. : 4,854,158

DATED : August 8, 1989

INVENTOR(S) : Donald C. Gates

Page 1 of 2

It is certified that error appears in the above-identified patent and that said Letters Patent is hereby corrected as shown below:

Abstract line on title page, line 8, insert "of" after --number--

Column 1, Line 11, "by" should be --be--

Column 2, Line 42, "to" should be --is--

Column 3, Line 61, "continuing" should be --continue--

Column 4, Line 39, delete "and" (2nd occurrence)

Column 4, Line 59, insert "is" after --photocells--

Column 5, Line 17, delete "be" after --not--

Column 5, Line 24, "current" should be --currents--

Column 6, Line 47, "preform" should be --perform--

Column 6, Line 49, "preform" should be --perform--

UNITED STATES PATENT AND TRADEMARK OFFICE
CERTIFICATE OF CORRECTION

PATENT NO. : 4,854,158

DATED : August 8, 1989

INVENTOR(S) : Donald C. Gates

It is certified that error appears in the above-identified patent and that said Letters Patent is hereby corrected as shown below:

Column 6, Line 59, "allowable" should be --tolerance--

Column 7, Line 4, "preform" should be --perform--

Column 7, Line 16, "give" should be --given--

Column 7, Line 58, Claim 5, "and" should be --said--

Column 8, Line 56, Claim 17, "bubble" should be --bubbles--

Column 9, Line 11, Claim 20, "mutli-vibrator" should be --multi-vibrator--

Column 9, Line 48, Claim 24, insert "to" after --rise-- and delete "the" after --rise--

Signed and Sealed this

Fifth Day of March, 1991

Attest:

HARRY F. MANBECK, JR.

*Attesting Officer*    *Commissioner of Patents and Trademarks*